Patented June 11, 1929.

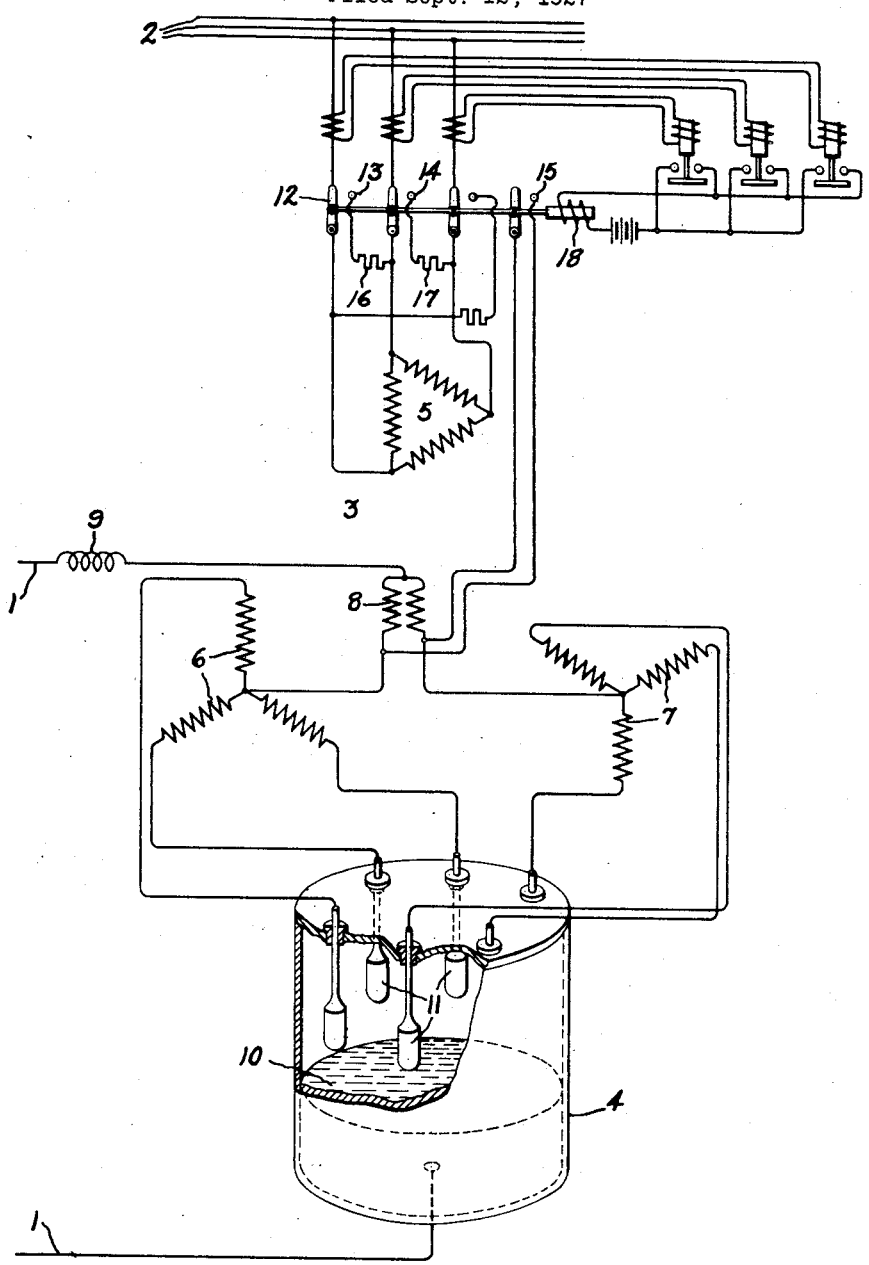

1,717,312

UNITED STATES PATENT OFFICE.

HERBERT D. BROWN AND CAMIL A. SABBAH, OF SCHENECTADY, NEW YORK, ASSIGNORS TO GENERAL ELECTRIC COMPANY, A CORPORATION OF NEW YORK.

RECTIFYING SYSTEM.

Application filed September 12, 1927. Serial No. 219,121.

Our invention relates to rectifying systems wherein power is interchanged between direct and alternating current circuits through means comprising a transformer and a vapor electric device, such as a mercury rectifier, and has for its principal object the provision of an improved apparatus and method of operation whereby the various parts of the system are protected against the electrical disturbances which are likely to be produced when destructive arcs occur within the evacuated tank of the rectifier.

One of the chief difficulties encountered in the operation of mercury arc rectifiers is the formation of destructive arcs between positively and negatively charged anodes or between other parts of the apparatus. This phenomenon is commonly known as arc-back. The reasons for arc-back have not been well understood in the past, and no entirely satisfactory means has been provided for protecting the transformer windings and the other parts of the system against the electrical disturbances which these arcs occasion. In accordance with our invention, these disturbances are largely avoided by the provision of means for greatly reducing the effective inductance of the transformer circuits when the arc of the rectifier becomes unstable due to opening of the switch through which power is supplied to the rectifier.

Our invention will be better understood from the following description when considered in connection with the accompanying drawing and its scope will be pointed out in the appended claims.

The drawing illustrates a rectifying system wherein our invention has been embodied.

This system comprises a direct current circuit 1 which is connected to an alternating current supply line 2 through means comprising a transformer 3 and a mercury rectifier 4. The transformer 3 is provided with a primary winding 5 and a pair of secondary windings 6 and 7 which have their neutral points interconnected through an interphase transformer winding 8, one side of the direct current circuit 1 being connected through a smoothing reactor 9 to a terminal intermediate the ends of the winding 8. The rectifier 4 is provided with a vaporizable cathode 10 which is connected to the other side of the direct current circuit and with anodes 11 which are connected to the different terminals of the secondary windings 6 and 7.

A switch 12 of any suitable type is provided for controlling the connections between the winding 5 and the circuit 2. This switch is preferably arranged to open in response to overload of the rectifier 4 and is provided with back contacts 13 to 15 whereby the windings 5 and 8 are short-circuited through resistors 16 and 17 when the switch is operated to its open position by energization of the operating coil 18. Short-circuiting of the alternating current line due to arcing between the switch contacts is prevented by the resistors 16 and 17.

Assuming the connections to be as illustrated and the circuit 1 to be energized by power supplied from the alternating current circuit 2, the voltage applied to the windings 6, 7 and 8 changes in value at a comparatively low rate. When arc-back occurs, a short-circuit is produced between the secondary terminals of the transformer and a very heavy current is transmitted through the rectifier. This produces energization of the operating coil 18 and causes the switch 12 to open. Since voltage is no longer applied to the anodes 11, the current of the anodes which happen to be transmitting current tends to decay at a rate dependent on the circuit constants. This rate of decay, however, seems only to persist until the pressure and ionization conditions within the evacuated receptacle of the rectifier 4 render the arc unstable. When the arc becomes unstable, the decay of the current is substantially instantaneous and independent of the circuit constants.

Numerous tests have shown that the rate at which the current decays after the arc becomes unstable is largely independent of the circuit constants, and that the induced voltage depends almost altogether on the inductance of the transformer windings. It therefore follows that a very high voltage is induced in these windings due to the sudden decrease in current when the arc is interrupted. Since this induced voltage depends on the effective inductance of the transformer windings, it is desirable that this inductance be made as small as possible when the arc is interrupted. This is accomplished by the back contacts of the switch 12 which operate to short-circuit the primary and interphase windings, thus changing the effective inductance of the transformer from its open circuit value to its leakage value and reducing the induced voltage by a ratio which is of the order of 100 to 1.

The embodiment of the invention illustrated and described herein has been selected for the purpose of clearly setting forth the principles involved. It will be apparent, however, that the invention is susceptible of being modified to meet the different conditions encountered in its use and we therefore aim to cover by the appended claims all modifications within the true spirit and scope of our invention.

What we claim as new and desire to secure by Letters Patent of the United States, is:

1. The combination of a mercuy arc rectifier comprising a cathode and a plurality of anodes, a transformer provided with a primary winding and with a secondary winding comprising terminals each connected to a different one of said anodes, and means arranged to short-circuit said primary winding when arc-back occurs within said rectifier.

2. The combination of a rectifier comprisign a cathode and a plurality of anodes, a transformer comprising a primary winding and polyphase secondary windings provided with terminals connected to said anodes, an interphase transformer winding connected between the neutrals of said polyphase windings, and means for short-circuiting said interphase transformer winding when arc-back occurs within said rectifier.

3. The combination of a rectifier comprising a cathode and a plurality of anodes, a transformer comprising a primary winding and polyphase secondary windings provided with terminals connected to said anodes, an interphase transformer winding connected between the neutrals of said polyphase windings, and means for short-circuiting said primary and interphase transformer windings when the current of said rectifier is interrupted.

4. The combination of a rectifier comprising a cathode and an anode, a transformer provided with a primary winding and with a secondary winding comprising a terminal connected to said anode, and means for reducing the effective impedance of said transformer when the current of said rectifier is interrupted.

5. The combination of a mercury arc rectifier comprising a cathode and an anode, means comprising an inductive circuit connected to said anode, and means comprising a short-circuiting switch for reducing the effective inductance of said circuit when arc-back occurs within said rectifier.

In witness whereof, we have hereunto set our hands this 8th day of September, 1927.

HERBERT D. BROWN.
CAMIL A. SABBAH.